US010462703B1

United States Patent
Stählin et al.

(10) Patent No.: US 10,462,703 B1
(45) Date of Patent: Oct. 29, 2019

(54) VEHICLE-TO-X COMMUNICATION DEVICE

(71) Applicant: Continental Teves AG & Co. oHG, Frankfurt am Main (DE)

(72) Inventors: Ulrich Stählin, Rochester, MI (US); Marc Menzel, Weimar (Lahn) (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 0 days.

(21) Appl. No.: 16/103,121

(22) Filed: Aug. 14, 2018

(51) Int. Cl.
*H04B 1/034* (2006.01)
*H04W 28/06* (2009.01)
*H04W 4/44* (2018.01)
*H04W 4/46* (2018.01)
*H04W 80/02* (2009.01)

(52) U.S. Cl.
CPC ............. *H04W 28/06* (2013.01); *H04W 4/44* (2018.02); *H04W 4/46* (2018.02); *H04W 80/02* (2013.01)

(58) Field of Classification Search
CPC .............................. H04W 4/40; H04B 7/18506
USPC .................................. 455/99, 96, 152.1, 345
See application file for complete search history.

(56) References Cited

U.S. PATENT DOCUMENTS

2016/0307384 A1* 10/2016 Sampei .............. G07C 9/00007
2017/0273128 A1* 9/2017 Abedini .............. H04J 13/0062
2018/0286229 A1* 10/2018 Szuprycinski .......... H04W 4/44

* cited by examiner

*Primary Examiner* — Tu X Nguyen
(74) *Attorney, Agent, or Firm* — RatnerPrestia

(57) ABSTRACT

A vehicle-to-X communication device, including a first processing unit for the processing of received vehicle-to-X messages and a second processing unit, wherein the vehicle-to-X communication device is configured to send vehicle-to-X messages during a starting sequence of the first processing unit by the second processing unit. Furthermore, the invention refers to the use of the vehicle-to-X communication device in a vehicle.

18 Claims, 1 Drawing Sheet

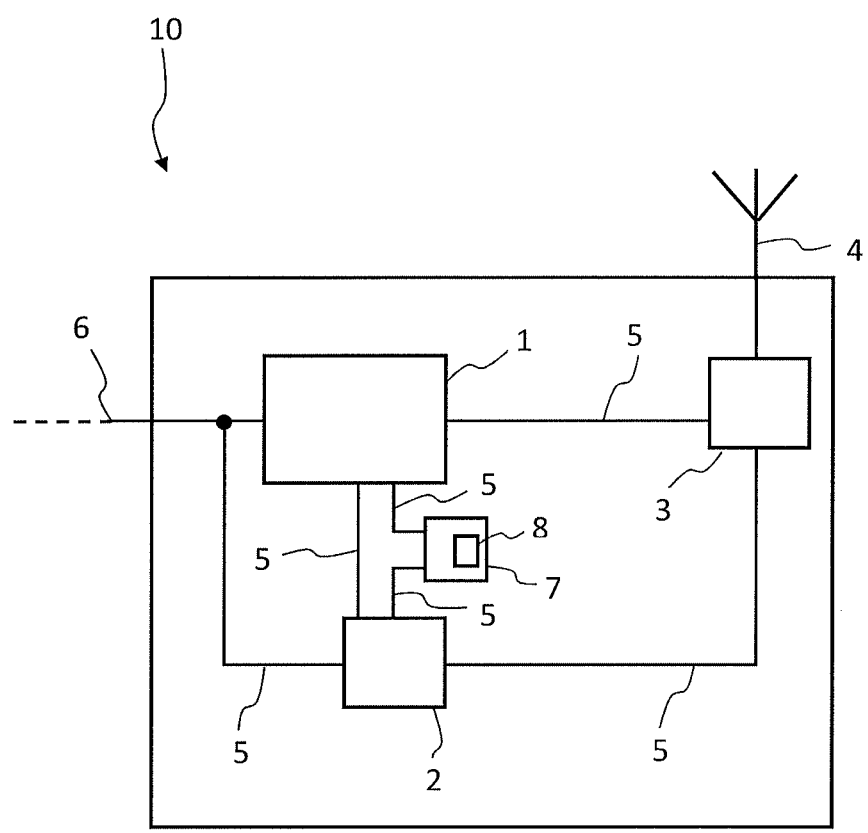

VEHICLE-TO-X COMMUNICATION DEVICE

FIELD OF THE INVENTION

The present invention refers to a vehicle-to-X communication device.

BACKGROUND OF THE INVENTION

Vehicle-to-X communication is currently on its way to being introduced into series production. In this case, the term 'vehicle-to-X communication' means in particular the combination of vehicle-to-vehicle communication and vehicle-to-infrastructure communication. In particular, it is provided in this case that vehicles send vehicle-to-X messages at specific intervals or during specific events, said vehicle-to-X messages comprising, by way of example, information regarding the speed, position, course, acceleration or particular events such as, by way of example, breakdowns or emergency braking maneuvers.

Current requirements, in particular in the USA, dictate that it must be feasible to send vehicle-to-X messages within 2 seconds of the vehicle starting (=ignition on). There are currently no guidelines regarding the readiness to receive vehicle-to-X messages within a specific period of time. However, the boot process of an operating system of a microcontroller, which is usually used for a vehicle-to-X communication device, takes a longer period of time, meaning that these requirements cannot be met at present.

SUMMARY OF THE INVENTION

An aspect of the invention is a vehicle-to-X communication device, by means of which the requirements regarding readiness to send within a defined period of time of the vehicle being started can be fulfilled.

An aspect of the invention refers to a vehicle-to-X communication device, comprising a first processing unit for the processing of received vehicle-to-X messages and a second processing unit. The vehicle-to-X communication device is preferably configured to send vehicle-to-X messages during a starting sequence of the first processing unit by means of the second processing unit. The first processing unit is expediently designed to carry out appropriate methods for processing vehicle-to-X messages. The second processing unit is expediently configured to process data to be sent or respectively vehicle-to-X messages, and to carry out appropriate methods, in particular during the start time of the first processing unit.

In particular, the term 'start time' within the meaning of an aspect of the invention means the time until the relevant processing unit is ready to process vehicle-to-X messages after being activated. As regards the sending of vehicle-to-X messages, this means in particular, within this context, the period of time which elapses before the processing of vehicle-to-X messages to be sent, or respectively the period of time which elapses before readiness to send vehicle-to-X messages is achieved. A processing unit is activated, by way of example, by a communication device which forms the basis thereof being supplied with energy and/or receiving a wake-up signal for activation, e.g. after the ignition of the vehicle is switched on.

A protocol stack, hereinafter referred to as a communication stack or a stack, which is constructed in such a way that the receiving and sending is viewed as one unit and is carried out in one control unit by means of a microcontroller or respectively microprocessor, is usually used for vehicle-to-X communication. Standards-compliant communication is realized both for receiving and for sending vehicle-to-X messages by means of this data structure. An aspect of the invention is now based on the realization that this implementation of the stack by an individual microcontroller, which is preferred for cost reasons, does however result in an inability to fulfil the requirements of complying with a defined period of time until readiness for sending vehicle-to-X messages is achieved. The processing for sending a vehicle-to-X message requires substantially less computational power and data memory, e.g. RAM, than, by way of example, a processing of received vehicle-to-X messages which generally require extensive computational resources and a powerful operating system which facilitates the processing but has a comparatively time-consuming boot process. In accordance with an aspect of the invention, it is now therefore proposed to send vehicle-to-X messages by means of a second processing unit which constitutes a functional, integral and/or structural unit which is substantially independent of the first processing unit. One advantage which is achieved as a result of this is that a predefined period of time, within which the sending of vehicle-to-X messages has to be made possible after the vehicle has been started, can be observed.

The vehicle can be a motor vehicle, in particular a car, a truck, a motorcycle, an electric vehicle or a hybrid vehicle, a water craft or an airplane.

In accordance with one embodiment, the communication device is configured to run a send protocol stack for sending vehicle-to-X messages by means of the second processing unit and to run a receive protocol stack for receiving vehicle-to-X messages by means of the first processing unit.

In accordance with one embodiment of an aspect of the invention, the second processing unit has a shorter start time or respectively boot time compared with the first processing unit. According to a further development, the second processing unit has lower computational resources than the first processing unit. As already described, the first processing unit is provided to run a more powerful operating system compared with the second processing unit. Usually, such an operating system requires larger computational resources than the functions to be carried out by means of the second processing unit for sending vehicle-to-X messages. These realizations constitute expedient possibilities, in order to achieve the shorter start time of the second processing unit.

According to a further development, the first processing unit is configured to realize the following functions of:
- guaranteeing the information security of incoming vehicle-to-X messages,
- filtering incoming vehicle-to-X messages, in particular taking account of the relevance thereof,
- allocating vehicle-to-X messages to vehicle-to-X objects,
- decoding incoming vehicle-to-X messages, by way of example in accordance with ASN.1,
- congestion control,
- providing information obtained from vehicle-to-X messages to at least one further vehicle system, for example driver assistance systems, airbag system, man-machine interface,
- diagnostic functions, and/or
- software updates by means of the vehicle-to-X interface.

According to a further development, the second processing unit is configured to realize the following functions of:
- receiving data for transmission by means of vehicle-to-X communication from at least one further vehicle system of the vehicle, guaranteeing the information security of vehicle-to-X messages to be sent, and/or encoding vehicle-to-X messages to be sent, in particular in accordance with ASN.1.

The first processing unit can likewise be expediently configured to realize the indicated functions, in particular if, following the starting sequence of the first processing unit, the vehicle-to-X messages are to be sent by means of the first processing unit, as explained in greater detail below.

In accordance with one embodiment of an aspect of the invention, the vehicle-to-X communication device comprises at least one transmitter for modulating a signal to be sent by means of an antenna to a carrier signal, wherein the transmitter is connected in a suitable manner to the second processing unit in order to transmit the signal.

In accordance with one embodiment of an aspect of the invention, the vehicle-to-X communication device comprises at least one receiver for demodulating a signal received by means of an antenna from a carrier signal, wherein the receiver is connected in a suitable manner to the first processing unit in order to transmit the signal.

The transceiver and the receiver expediently jointly form a transmitting/receiving apparatus (so-called transceiver) which in particular has functional assemblies which are at least partially used jointly.

In accordance with one embodiment, the vehicle-to-X communication device is configured to send vehicle-to-X messages following a starting sequence of the first processing unit by means of the first processing unit and/or by means of the second processing unit. Accordingly, the first processing unit can be configured to process vehicle-to-X messages to be sent and to carry out appropriate methods. In the case where the vehicle-to-X messages are sent following a starting sequence of the first processing unit by means of the first processing unit, this results in particular in the advantage that the second processing unit is provided for other calculations. In particular, in the event that sending of vehicle-to-X messages is also envisaged by means of the first processing unit, the latter is likewise connected in a suitable manner to the transmitter in order to transmit data.

In accordance with one embodiment of an aspect of the invention, the communication device has a signing apparatus for signing vehicle-to-X messages to be sent without the involvement of the first processing unit or respectively without initiation by the first processing unit. Advantageously, signed vehicle-to-X messages can consequently be sent during the start time. In particular, the communication device furthermore has at least one data memory allocated to the signing apparatus for storing security certificates for signing vehicle-to-X messages to be sent.

In accordance with one embodiment, the communication device is configured to initiate the signing of vehicle-to-X messages to be sent by means of the signing apparatus by the second processing unit and/or by means of the transmitter. The signing apparatus is therefore expediently connected in a suitable manner to the second processing unit and/or the transmitter in order to transmit data.

Alternatively or additionally, it can be provided in accordance with one embodiment that the signing apparatus is connected in a suitable manner to the first processing unit in order to transmit data. Within the meaning of increased information security, it is however particularly advantageous if the signing apparatus is simply connected in a suitable manner to the first processing unit or the second processing unit in order to transmit data.

In accordance with one embodiment, the vehicle-to-X communication device is configured to initiate the signing of vehicle-to-X messages to be sent following a starting sequence of the first processing unit by means of the first processing unit and/or the second processing unit and/or the transmitter.

Alternatively or additionally, according to a further development, the vehicle-to-X communication device can comprise a further signing apparatus for signing vehicle-to-X messages to be sent and/or a further data memory for storing security certificates, which is/are connected in a suitable manner to the first processing unit in order to transmit data. Following a starting sequence of the first processing unit, a signing of vehicle-to-X messages to be sent, which is initiated by the first processing unit, is expediently effected by means of the further signing apparatus and/or by enlisting security certificates of the further data memory. These embodiments are expedient, in particular in the case of the transfer of the task of sending from the second processing unit to the first processing unit following the starting sequence of the first processing unit. Furthermore, it is expedient according to these embodiments that the further data memory has a larger disk space than the data memory which, in accordance with this configuration, essentially only has to have security certificates available for the comparatively short period of time, in each case, of the starting sequence of the first processing unit. Accordingly, the further data memory has, according to a further development, a larger number of security certificates than the data memory. In principle, it can also be provided that the signing apparatus accesses the further data memory in order to sign vehicle-to-X messages following a starting sequence of the first processing unit.

In accordance with one embodiment of an aspect of the invention, the first processing unit and the second processing unit and/or the first processing unit and the transmitter or respectively receiver are connected to one another in a suitable manner in order to transmit data. According to a further development, it can be provided that a received vehicle-to-X message is transmitted by the second processing unit to the first processing unit. In particular, this is relevant if no suitable connection for transmitting data exists between the first processing unit and the transceiver. At least one of the connections for transmitting data is, in particular, a parallel interface. The latter is in particular advantageous if the transceiver or respectively transmitter is provided for signing vehicle-to-X messages to be sent.

In accordance with one embodiment, the first processing unit and the second processing unit are coupled by means of an encryption protocol and a shared secret, for example a code. The shared secret can, by way of example, preferably be programmed so that it cannot be read out during the production of the communication device or respectively the processing units. One resulting advantage is that none of the processing units can be used without the other, in order to e.g. request certificates without authorization.

In accordance with one embodiment of an aspect of the invention, a microcontroller which is originally provided for the operation of a vehicle access system or a derivative of a microcontroller family regarding this is enlisted for use as the second processing unit. Usually, the microcontrollers provided for the operation of a vehicle access system essentially have the performance features which are also imposed on the second processing unit within the meaning of an aspect of the invention. By using a microcontroller which is actually provided as such for the operation of a vehicle access system as the second processing unit within the meaning of an aspect of the invention, considerable costs can consequently be saved.

In accordance with one further development of an aspect of the invention, a microcontroller which is originally provided for the operation of a Network Access Device (NAD) or a derivative of a microcontroller family regarding this is enlisted for use as the first processing unit. Considerable costs can also be saved by these further developments.

BRIEF DESCRIPTION OF THE DRAWINGS

Some particularly advantageous configurations of aspects of the invention are indicated in the subclaims. Further preferred embodiments are set out by the following description of embodiment examples with reference to the FIGURE, wherein:

The FIGURE shows a block diagram of an embodiment example of the vehicle-to-X communication device according to an aspect of the invention.

DETAILED DESCRIPTION OF THE PREFERRED EMBODIMENTS

The vehicle-to-X communication device 10 according to the FIGURE comprises a first processing unit 1 and a second processing unit 2. The vehicle-to-X communication device 10 is configured to transmit vehicle-to-X messages to other road users or respectively the infrastructure by means of the transceiver 3 and antenna 4. In order to transmit data or respectively signals, the vehicle-to-X communication device 10 has suitable transmission lines 5. Data communication with further vehicle systems of the vehicle takes place by means of a data line 6.

After the vehicle has been started, for example the ignition of the vehicle has been switched on, the first processing unit 1 and second processing unit 2 are initialized, which is followed by a period of time for booting the operating systems of the first and second processing unit. Here, the second processing unit 2 has a shorter start time compared with the first processing unit 1, which is in particular realized in that the first processing unit 1 runs a more powerful operating system compared with the second processing unit 2, which needs a longer start time. Vehicle-to-X messages can already be sent by means of the second processing unit 2 during the starting sequence of the first processing unit 1, as a consequence of the shortened start time.

In addition, the vehicle-to-X communication device 1 comprises a signing apparatus 7 for signing vehicle-to-X messages to be sent, which is connected to the second processing unit 2 by means of a transmission line 5. A data memory 8 is allocated to the signing apparatus 7 for storing security certificates. Vehicle-to-X messages to be sent are signed by the signing apparatus 7 during the start time, according to the example, as a consequence of being initiated by the second processing unit. The signed vehicle-to-X messages are sent, following transmission to a transmitter comprised by a transceiver 3, by means of an antenna 4.

Following a starting sequence of the first processing unit 1, it is provided in accordance with one embodiment that vehicle-to-X messages are in addition sent by means of the first processing unit 1, the task therefore passes from the second processing unit 2 to the first processing unit 1. In order to make possible the signing of vehicle-to-X messages to be sent following the starting sequence of the first processing unit 1, the first processing unit 1 is likewise connected by means of a transmission line 5 to the signing apparatus 7.

To ensure that security certificates cannot, for example, be requested by means of one of the two processing units without authorization, it can furthermore prove to be expedient to couple the first processing unit 1 and the second processing unit 2 by means of an encryption protocol and a shared secret. This can be provided such that neither of the two processing units can be utilized without the other in each case for carrying out safety-critical measures such as, by way of example, requesting security certificates. A data exchange which may possibly be a prerequisite for this can, as shown in the FIGURE, be realized by means of a transmission line 5.

If in the course of the proceedings it transpires that a feature or a group of features is not absolutely necessary, then the applicant here and now seeks a wording of at least one independent claim, no longer comprising the feature or the group of features. This may, by way of example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of the invention which are described in the various embodiments or embodiment examples and/or shown in the FIGURE, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

It should be pointed out in general that vehicle-to-X communication means, in particular, a direct communication between vehicles and/or between vehicles and infrastructure facilities and/or road users in general. By way of example, therefore, vehicle-to-vehicle communication or vehicle-to-infrastructure communication may be involved. Where communication between vehicles is referred to within the framework of this application, this can essentially, by way of example, take place within the framework of vehicle-to-vehicle communication, which typically takes place without the intermediary of a mobile network or a similar external infrastructure and which can therefore be distinguished from other solutions which, by way of example, are based on a mobile network. By way of example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). The invention expressly does not, however, exclude vehicle-to-X communication with the intermediary of, by way of example, a mobile network.

The invention claimed is:

1. A vehicle-to-X communication device, comprising:
   a first processing unit for the processing of received vehicle-to-X messages; and
   a second processing unit, wherein the second processing unit is configured to send vehicle-to-X messages during a starting sequence of the first processing unit, and wherein the second processing unit has a shorter start time compared with the first processing unit.

2. The vehicle-to-X communication device according to claim 1, configured to run a send protocol stack for sending vehicle-to-X messages by the second processing unit and to run a receive protocol stack for receiving vehicle-to-X messages by the first processing unit.

3. The vehicle-to-X communication device according to claim 1, configured to send vehicle-to-X messages following a starting sequence of the first processing unit by the first processing unit and/or by the second processing unit.

4. The vehicle-to-X communication device according to claim 1, comprising a signing apparatus for signing vehicle-to-X messages to be sent without the involvement of the first processing unit and at least one data memory allocated to the signing apparatus for storing security certificates for signing vehicle-to-X messages to be sent.

5. The vehicle-to-X communication device according to claim 4, configured to initiate the signing of vehicle-to-X messages to be sent by the signing apparatus by the second processing unit and/or by a transmitter comprised by the vehicle-to-X communication device for modulating a signal to be sent to a carrier signal.

6. The vehicle-to-X communication device according to claim 5, wherein the signing apparatus is connected in a suitable manner to the second processing unit in order to transmit data and is not connected in a suitable manner to the first processing unit in order to transmit data.

7. The vehicle-to-X communication device according to claim 5, comprising a further signing apparatus for signing vehicle-to-X messages to be sent and/or a further data memory for storing security certificates, which is connected in a suitable manner to the first processing unit in order to transmit data.

8. The vehicle-to-X communication device according to claim 5, configured to initiate the signing of vehicle-to-X messages to be sent following a starting sequence of the first processing unit by the first processing unit and/or the second processing unit and/or the transmitter.

9. The vehicle-to-X communication device according to claim 8, wherein the signing apparatus is connected in a suitable manner to the second processing unit in order to transmit data and is not connected in a suitable manner to the first processing unit in order to transmit data.

10. The vehicle-to-X communication device according to claim 8, comprising a further signing apparatus for signing vehicle-to-X messages to be sent and/or a further data memory for storing security certificates, which is connected in a suitable manner to the first processing unit in order to transmit data.

11. The vehicle-to-X communication device according to claim 4, wherein the signing apparatus is connected in a suitable manner to the second processing unit in order to transmit data and is not connected in a suitable manner to the first processing unit in order to transmit data.

12. The vehicle-to-X communication device according to claim 11, comprising a further signing apparatus for signing vehicle-to-X messages to be sent and/or a further data memory for storing security certificates, which is connected in a suitable manner to the first processing unit in order to transmit data.

13. The vehicle-to-X communication device according to claim 4, comprising a further signing apparatus for signing vehicle-to-X messages to be sent and/or a further data memory for storing security certificates, which is connected in a suitable manner to the first processing unit in order to transmit data.

14. The vehicle-to-X communication device according to claim 1, wherein the first processing unit and the second processing unit are coupled by an encryption protocol and a shared secret.

15. The vehicle-to-X communication device according to claim 1, wherein a microcontroller which is originally provided for the operation of a vehicle access system or a derivative of a microcontroller family regarding this is enlisted as the second processing unit.

16. The vehicle-to-X communication device according to claim 1, wherein a microcontroller which is originally provided for the operation of a network access device or a derivative of a microcontroller family regarding this is enlisted for use as the first processing unit.

17. A vehicle comprising the vehicle-to-X communication device according to claim 1.

18. A vehicle-to-X communication device, comprising:
a first processing unit for the processing of received vehicle-to-X messages; and
a second processing unit,
wherein the second processing unit is configured to send vehicle-to-X messages during a starting sequence of the first processing unit, and
wherein the second processing unit has lower computational resources than the first processing unit.

* * * * *